United States Patent
Wang et al.

(10) Patent No.: US 11,609,701 B1
(45) Date of Patent: Mar. 21, 2023

(54) POWER MANAGEMENT METHOD AND POWER MANAGEMENT DEVICE

(71) Applicant: Ufi Space co., Ltd., New Taipei (TW)

(72) Inventors: Yu-Min Wang, Taoyuan (TW);
Chih-Tsao Chang, New Taipei (TW);
Ying-Hsiu Lai, New Taipei (TW)

(73) Assignee: Ufi Space co., Ltd., New Taipei (TW)

( * ) Notice: Subject to any disclaimer, the term of this patent is extended or adjusted under 35 U.S.C. 154(b) by 3 days.

(21) Appl. No.: 17/528,170

(22) Filed: Nov. 16, 2021

(30) Foreign Application Priority Data

Nov. 8, 2021 (TW) .................................. 110141530

(51) Int. Cl.
*G06F 3/06* (2006.01)
(52) U.S. Cl.
CPC .......... *G06F 3/0625* (2013.01); *G06F 3/0655* (2013.01); *G06F 3/0673* (2013.01)
(58) Field of Classification Search
CPC ..... G06F 3/0625; G06F 3/0673; G06F 3/0655
USPC ......................................................... 711/154
See application file for complete search history.

(56) References Cited

U.S. PATENT DOCUMENTS

| | | | | |
|---|---|---|---|---|
| 9,991,741 | B1 * | 6/2018 | Bell ..................... | H02J 7/00034 |
| 2007/0033438 | A1 * | 2/2007 | Hsieh ..................... | G06F 11/00 |
| | | | | 714/24 |
| 2013/0322281 | A1 * | 12/2013 | Ludlow ................. | H04W 48/18 |
| | | | | 370/252 |
| 2015/0121149 | A1 * | 4/2015 | Cooke ................... | H04L 1/0041 |
| | | | | 714/43 |

FOREIGN PATENT DOCUMENTS

| | | |
|---|---|---|
| CN | 101989219 | 3/2011 |
| CN | 107193713 | 9/2017 |
| TW | 200403563 | 3/2004 |
| TW | I509401 | 11/2015 |

OTHER PUBLICATIONS

"Office Action of Taiwan Counterpart Application", dated Aug. 31, 2022, p. 1-p. 5.

* cited by examiner

*Primary Examiner* — Christopher B Shin
(74) *Attorney, Agent, or Firm* — JCIPRNET

(57) ABSTRACT

The disclosure provides a power management method and a power management device. The method includes: reading a specific memory which includes a plurality of error data records; selecting a specific data record based on a usage status indicator of each error data record; sequentially sending an enable signal to each hardware device; in response to determining that an enable successful response corresponding to the enable signal is not received from a specific hardware device, or a boot alarm is received, at least obtaining a low pin count value and a power management status; recording the low pin count value and the power management status in the specific data record, and accordingly updating the usage status indicator of the specific data record.

20 Claims, 3 Drawing Sheets

POWER MANAGEMENT METHOD AND POWER MANAGEMENT DEVICE

CROSS-REFERENCE TO RELATED APPLICATION

This application claims the priority benefit of Taiwan application serial no. 110141530, filed on Nov. 8, 2021. The entirety of the above-mentioned patent application is hereby incorporated by reference herein and made a part of this specification.

BACKGROUND

Technology Field

The disclosure relates to a power management mechanism, and particularly, to a power management method and a power management device adapted for a central processing unit (CPU).

Description of Related Art

Generally speaking, when booting a computer, it requires to perform related boot/enable process on the CPU. Since the CPU includes various hardware devices/components, when starting the CPU, the hardware devices/components have to be enabled in sequence according to the standards of the relevant CPU circuit specifications.

However, a hardware device/component boot failure often leaves maintenance personnel unable to know the cause, and there is difficulty in fixing the boot failure.

SUMMARY

In view of this, the disclosure provides a power management method and a power management device, which can be applied to solve the technical problems.

The disclosure provides a power management method, adapted to control a power management device of multiple hardware devices. The power management method includes steps as follows. A specific memory in the power management device is read. The specific memory includes multiple error data records, and each of the error data records includes a usage status indicator. A specific data record is selected from the error data records based on the usage status indicator of each of the error data records. An enable signal is sequentially sent to each of the hardware devices. In response to determining that an enable successful response corresponding to the enable signal is not received from a specific hardware device of the hardware devices, or a boot alarm is received, a low pin count (LPC) value and a power management status are obtained at least. The low pin count value and the power management status are recorded in the specific data record, and the usage status indicator of the specific data record is accordingly updated.

The disclosure provides a power management device, which controls multiple hardware devices. The power management device includes a specific memory and a power management circuit. The specific memory includes multiple error data records, and each of the error data records has a usage status indicator. The power management circuit is coupled to the specific memory and is configured to perform: reading the specific memory in the power management device; selecting a specific data record from the error data records based on the usage status indicator of each of the error data records; sequentially sending an enable signal to each of the hardware devices; in response to determining that an enable successful response corresponding to the enable signal is not received from a specific hardware device of the hardware devices, or a boot alarm is received, at least obtaining a low pin count (LPC) value and a power management status; recording the low pin count value and the power management status in the specific data record, and accordingly updating the usage status indicator of the specific data record.

DESCRIPTION OF THE EMBODIMENTS

Figure 1:
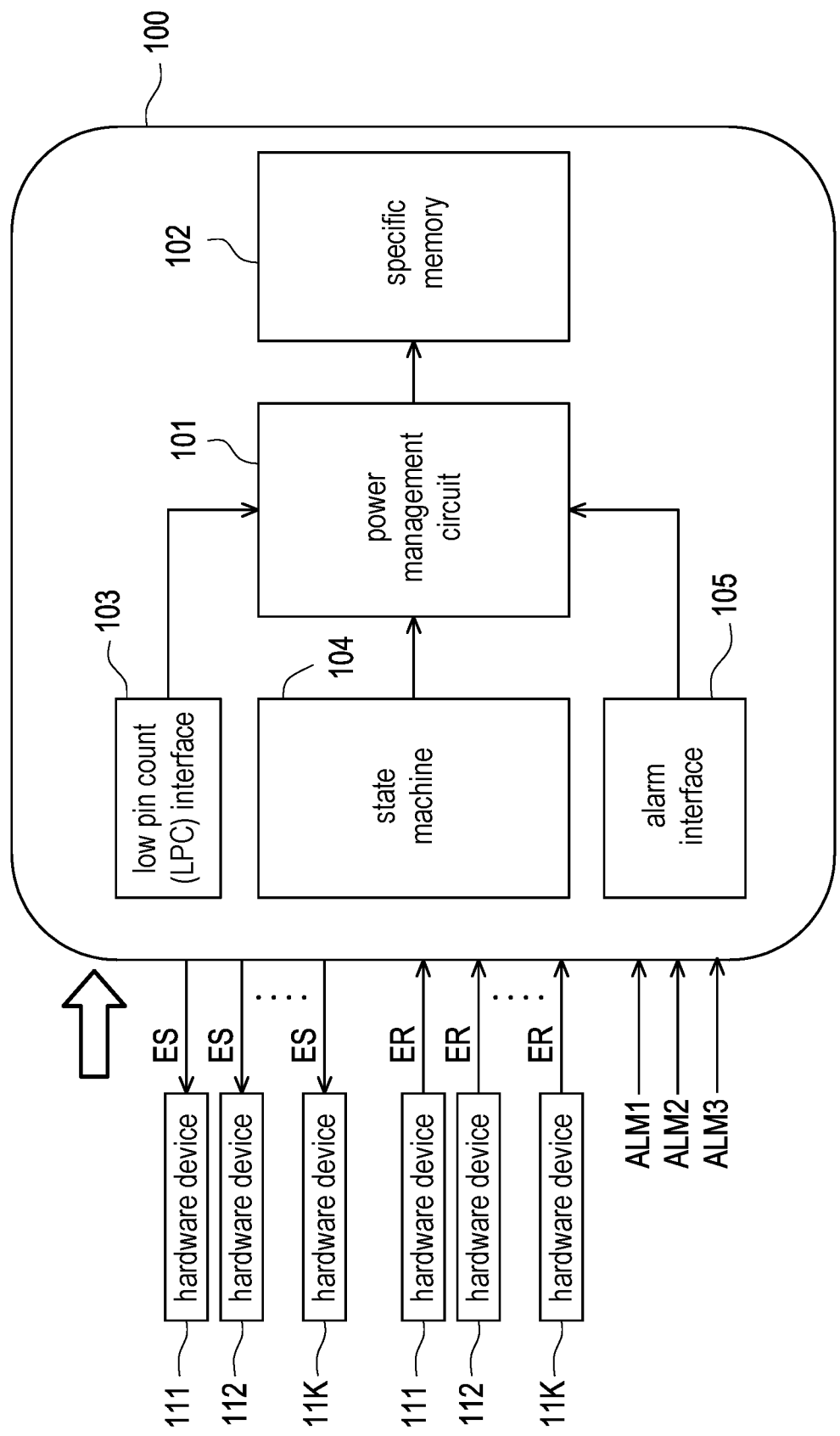
FIG. 1 is a schematic view of a power management device according to an embodiment of the disclosure.

Referring to FIG. 1, FIG. 1 is a schematic view of a power management device according to an embodiment of the disclosure. In the embodiment of the disclosure, for example, a power management device 100 may include a power management circuit 101 and a specific memory 102. The power management circuit 101 is coupled to the specific memory 102, and the specific memory 102 may be implemented as a non-volatile memory, for example.

In some embodiments, for example, the power management device 100 along with a processor (e.g., a CPU) may be disposed in the same electronic device (e.g., various smart devices and/or computer devices), and the power management device 100 is used for power management of multiple hardware devices 111-11K (K is the number of hardware devices) in the processor.

In some embodiments, the power management device 100 may further include a low pin count (LPC) interface 103, a state machine 104, and an alarm interface 105 which are each connected to the power management circuit 101. In one embodiment, the LPC interface 103 may be used to obtain a relevant low pin count (LPC) value/data from a port 80 on an LPC bus of the electronic device. Moreover, when the electronic device is turned on, the alarm interface 105 may be used to receive various alarms that appear and may provide the alarms to the power management circuit 101.

Figure 2:
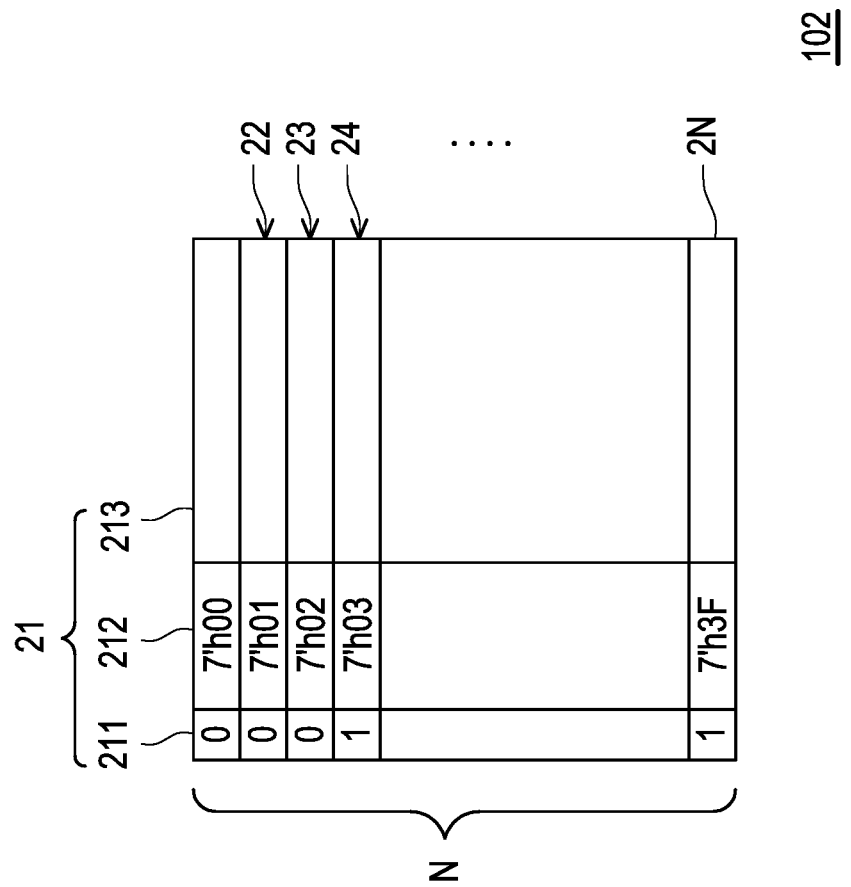
FIG. 2 is a schematic view of multiple error data records according to an embodiment of the disclosure.

In an embodiment, the specific memory 102 may include multiple error data records, and each of the error data records may have a usage status indicator. Referring to FIG. 2, FIG. 2 is a schematic view of multiple error data records according to an embodiment of the disclosure.

As shown in FIG. 2, the specific memory 102 may include N error data records 21-2N, which may have a similar/the same data structure each. For ease of understanding, in the subsequent paragraphs, the error data record 21 is illustrated as an example, and those with ordinary knowledge in the field should be able to understand the details of other error data records 22-2N accordingly.

In an embodiment, the error data record 21 may include a usage status indicator 211, an address field 212, and an error data field 213. The usage status indicator 211 may be used to indicate a used state or an unused state. In some embodiments, when the usage status indicator 211 indicates a used status (which can be represented by a first logical value (e.g., 0)), it may mean that the error data record 21 has been used. Moreover, the address field 212 may be used to record the address of the error data record 21, but it is not limited thereto.

In one embodiment, if the error data field 213 of the error data record 21 has been used to record related error data corresponding to a specific error of the processor, the error data record 21 may be defined as used, but it is not limited thereto. On the other hand, when the usage status indicator 211 indicates an unused status (which can be represented by a second logical value (e.g., 1)), it may mean that the error data record 21 is not used. In one embodiment, if the error data field 213 of the error data record 21 has not been used to record related error data corresponding to a specific error of the processor, the error data record 21 may be defined as unused, but it is not limited thereto.

For example, in the scenario of FIG. 2, since the usage status indicators of the error data records 21-23 all indicate the first logical value (i.e., 0), it is known that the error data fields of the error data records 21-23 each have been used to record relevant error data corresponding to a specific error of the processor. Moreover, since the usage status indicators of the error data record 24-2N all indicate the second logical value (i.e., 1), it is known that the error data fields of the error data record 24-2N have not been used to record any error data, but it is not limited thereto.

In different embodiments, the designer can set the memory space occupied by the error data records 21-2N according to requirements. In one embodiment, assuming that N is 128 and the length of each of the error data records 21-2N is 32 bits, the error data records 21-2N can occupy a space of 128×32 bits in total, but it is not limited thereto.

In different embodiments, the designer can also adjust the lengths of the usage status indicator, the address field, and the error data field corresponding to each of the error data records 21-2N according to requirements. In one embodiment, the lengths of the usage status indicator, the address field, and the error data field corresponding to each of the error data records 21-2N can be set to 1 bit, 7 bits, and 24 bits, for example, but it is not limited thereto.

In the embodiment of the disclosure, the power management circuit 101 may access related modules and program codes to implement the power management method proposed by the disclosure, and the details thereof is illustrated as follows.

Figure 3:
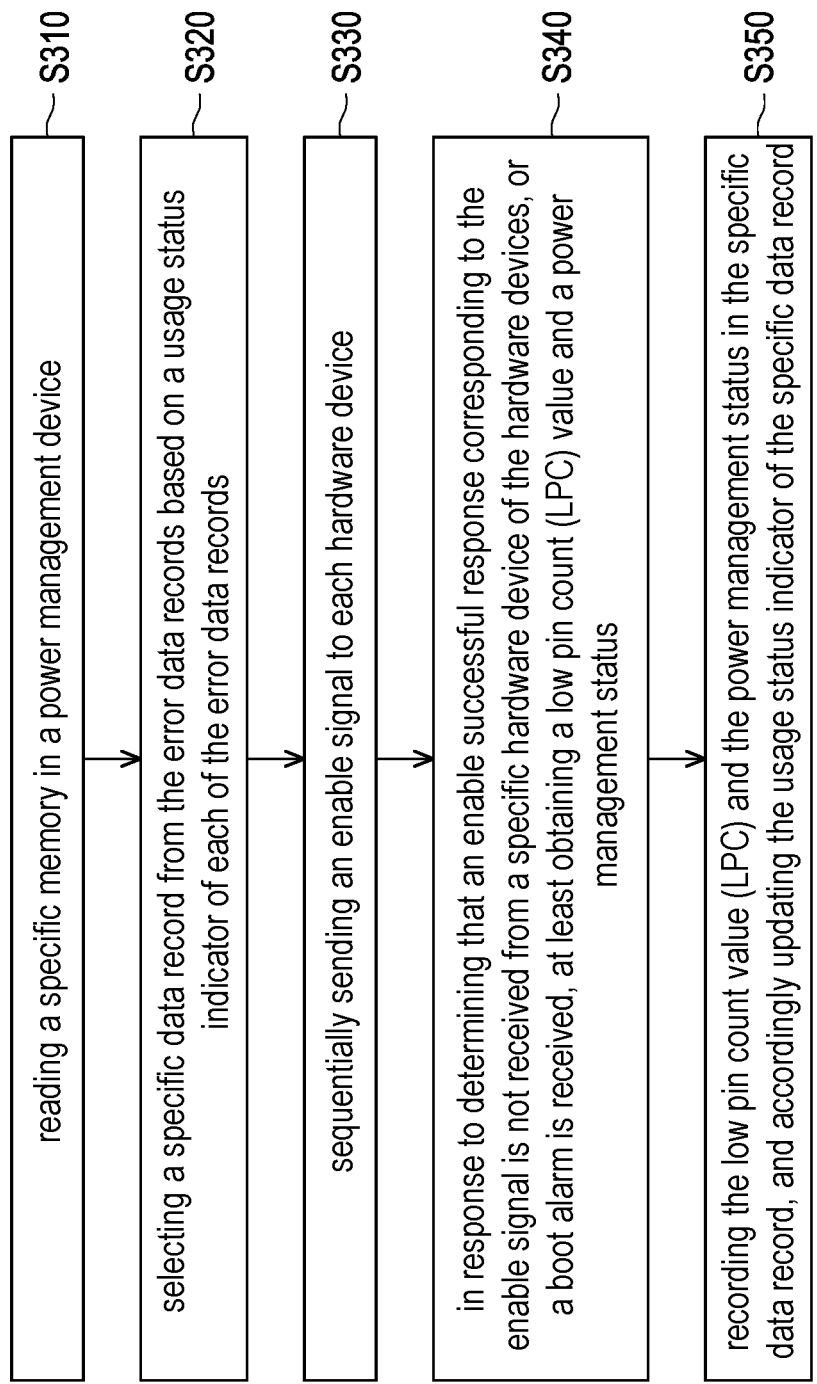
FIG. 3 is a flowchart illustrating a power management method according to an embodiment of the disclosure.

Referring to FIG. 3, FIG. 3 is a flowchart illustrating a power management method according to an embodiment of the disclosure. The method of the embodiment may be performed by the power management device 100 of FIG. 1. With reference to the elements shown in FIG. 1 and the illustration of FIG. 2, details of each step of FIG. 3 are illustrated in the subsequent paragraphs.

First, in step S310, the power management circuit 101 reads the specific memory 102 in the power management device 100. In one embodiment, the power management circuit 101 may obtain the content of the error data records 21-2N by reading the specific memory 102, but it is not limited thereto.

In step S320, the power management circuit 101 selects a specific data record from the error data records 21-2N based on the usage status indicator of each of the error data records 21-2N.

In the first embodiment, the power management circuit 101 may select at least one candidate data record from the error data records 21-2N. The usage status indicator of each candidate data record indicates an unused state. That is, the power management circuit 101 may select one or more of the error data records 21-2N that have not been used to record any error data as the candidate data records. For example, the power management circuit 101 may select one or more of the error data records 21-2N whose usage status indicator indicates an unused state (e.g., 1) as the candidate data records. Subsequently, the power management circuit 101 may select one of the candidate data records as a specific data record.

For example, in the scenario of FIG. 2, the power management circuit 101 may select the error data records 24-2N as candidate data records, and one of the candidate data records is selected as the specific data record, but it is not limited thereto.

In one embodiment, if the power management circuit 101 cannot find any candidate data records from the error data records 21-2N, it means that the error data records 21-2N each have been used to store the corresponding error data. In this case, the power management circuit 101 may change the usage status indicator of each of the error data records 21-2N to indicate an unused state and reselect at least one candidate data record from the error data records 21-2N. For example, the power management circuit 101 may change the usage status indicator of each of the error data records 21-2N to indicate the second logical value (e.g., 1), from which candidate data records and specific data records are selected based on the teaching, but it is not limited thereto.

In the second embodiment, in the process that the power management circuit 101 selects a specific data record from the error data records 21-2N, the power management circuit 101 may also perform the following steps: (a1) obtaining the i-th error data record in the error data records 21-2N and the usage status indicator of the i-th error data record, where the initial value of i is 1; (a2) in response to determining that the usage status indicator of the i-th error data record indicates that the i-th error data record is not used, determining that the i-th error data record is a specific data record; (a3) in response to determining that the usage status indicator of the i-th error data record indicates that the i-th error data record has been used, incrementing i and repeating step (a1).

In short, the power management circuit 101 may sequentially look down from the error data record 21 until an unused error data record is found as a specific data record. Therefore, in the scenario of FIG. 2, the power management circuit 101 may find the error data record 24 as a specific data record.

Moreover, in the second embodiment, in the step of in response to that the power management circuit 101 determines that the use state indicator of the error data record 2N indicates that the error data record 2N has been used, it means that the error data records 21-2N each have been used to store the corresponding error data. In this case, the power management circuit 101 may reset the usage status indicator of each of the error data records 21-2N and return to perform step (a1). In one embodiment, the power management circuit 101 may reset the use state indicator of each of the error data records 21-2N by changing the usage status indicator of each of the error data records 21-2N to indicate a second logical value (e.g., 1), but it is not limited thereto. In this case, the power management circuit 101 may select the error data record 21 as the specific data record after performing step (a1) and step (a2).

After determining the specific data record, in step S330, the power management circuit 101 sequentially sends an enable signal ES to each of the hardware devices 111-11K, and the enable signal ES is used to enable (e.g., boot/start) each of the hardware devices 111-11K. As mentioned, to boot the processor smoothly, it requires that the hardware devices 111-11K are enabled/started according to the order specified in the relevant specifications.

In one embodiment, when the power management circuit 101 is performing step S330, the power management circuit 101 may be configured to perform: (b1) sending the enable signal ES to the i-th hardware device of the hardware devices 111-11K, where the initial value of i is 1; (b2) in response to determining that an enable successful response ER corresponding to the enable signal ES is received from the i-th hardware device, incrementing i, and repeating step (b1).

Moreover, in response to that the power management circuit 101 determines that the enable successful response ER corresponding to the enable signal ES is not received from the i-th hardware device within a specified time, the power management circuit 101 may determine that the i-th hardware device is a specific hardware device.

In some embodiments, the power management circuit 101 may be controlled by the state machine 104 to perform step S330. For example, the state machine 104 may be used to control the power management circuit 101 to send an enable signal ES to the i-th hardware device, and the state machine 104 may be used to monitor whether the enable successful response ER is received from the i-th hardware device. If yes, the state machine 104 may re-control the power management circuit 101 to send the enable signal ES to the next hardware device, but it is not limited thereto.

In one embodiment, the i-th hardware device may execute its own boot/start process in response to the enable signal ES, and the i-th hardware device may send an enable successful response ER back to the power management circuit 101 after the boot/start process is completed to notify the power management circuit 101 that the boot/start process has been completed. Therefore, if the power management circuit 101 can receive the enable successful response ER from the i-th hardware device within the specified time, the power management circuit 101 can know that the i-th hardware device has completed the boot/start process, and then the enable signal ES is sent to the next hardware device to repeat the mechanism.

In other words, if the power management circuit 101 fails to receive the enable successful response ER from the i-th hardware device within the specified time, it means that the i-th hardware device may not successfully complete the boot/start process. Meanwhile, the power management circuit 101 may determine the i-th hardware device as a specific hardware device and proceed to step S340 to step S350.

In step S340, in response to that the power management circuit 101 determines that the enable successful response ER corresponding to the enable signal ES is not received from the specific hardware device of the hardware devices 111-11K, or an alarm related to the specific hardware device is received, the power management circuit 101 at least obtains the low pin count (LPC) value and the power management state.

In one embodiment, for example, the power management status may record the i-th hardware device currently started, that is, the specific hardware device. For example, if the power management circuit 101 fails to receive the enable successful response ER from the hardware device 112 within the specified time after sending the enable signal ES to the hardware device 112, the hardware device 112 is the considered specific hardware device, and the power management state may accordingly stop recording the boot process of the processor when it reaches the hardware device 112, but it is not limited thereto.

In one embodiment, the power management circuit 101 may obtain the required low pin count (LPC) value from a low pin count (LPC) bus through the LPC interface 103, for example. In some embodiments, the LPC interface 103 may obtain the LPC value by decoding the data of the address 0x80 on the LPC bus, for example, and the LPC value may correspond to the type/content of the error currently occurring in the specific hardware device. For example, if the specific hardware device is a failed hard disk, the corresponding LPC value may correspond to the hard disk failure, for example; if the specific hardware device is a failed memory, the corresponding LPC value may correspond to the memory failure, for example; if the specific hardware device is a failed motherboard, the corresponding LPC value may correspond to the motherboard failure, but it is not limited thereto.

Next, in step S350, the power management circuit 101 records the LPC value and the power management status in the specific data record and updates the usage status indicator of the specific data record accordingly.

Taking FIG. 2 as an example, assuming that the power management circuit 101 selects the error data record 24 as the considered specific data record according to the previous teaching, the power management circuit 101 may record the obtained LPC value and the power management status in the error data field of the error data record 24 accordingly.

In one embodiment, the error data field of the error data record 24 may be at least divided into a first part, a second part, and a third part. The first part may be used to store the LPC value, and the second part may be used to store the power management state, for example.

In one embodiment, if the power management circuit 101 determines that one of boot alarms ALM1-ALM3 is received, the boot alarm may be recorded in a specific data record. In this case, the third part may be used to store the boot alarm, but it is not limited thereto.

In different embodiments, the respective lengths of the first part, the second part, and the third part may be set according to the needs of the designer. For example, when the length of the error data field of the error data record 24 is 24 bits, the lengths of the first part, the second part, and the third part may be set to 16 bits, 5 bits, and 3 bits, respectively, but the disclosure is not limited thereto.

In this way, when the user of the electronic device sends the electronic device for maintenance, the involved maintenance personnel can check the content of the error data records 21-2N of the specific memory 102 to know what type of errors may happen to the electronic device, and thereby the efficiency of subsequent debugging/maintenance is improved.

In summary, the method proposed by the disclosure may record the related information (e.g., an LPC value, a power management status, a boot alarm, and the like) of the hardware device that has failed during the boot process of the processor through a specially designed memory in the power management device. Accordingly, the involved maintenance personnel can check the content of the specific memory to know what type of errors may happen to the electronic device, and thereby the efficiency of subsequent debugging/maintenance is improved Although the disclosure has been described with reference to the above embodiments, they are not intended to limit the disclosure. It will be apparent to one of ordinary skill in the art that modifications and changes to the described embodiments may be made without departing from the spirit and the scope of the disclosure. Accordingly, the scope of the disclosure will be defined by the attached claims and their equivalents and not by the above detailed descriptions.

What is claimed is:

1. A power management method, adapted to control a power management device of a plurality of hardware devices, comprising:
    reading a specific memory in the power management device, wherein the specific memory comprises a plurality of error data records, and each of the error data records comprises a usage status indicator;
    selecting a specific data record from the error data records based on the usage status indicator of each of the error data records;
    sequentially sending an enable signal to each of the hardware devices, wherein the enable signal is used to enable each of the hardware devices;
    in response to determining that an enable successful response corresponding to the enable signal is not received from a specific hardware device of the hardware devices, or a boot alarm is received, at least obtaining a low pin count (LPC) value and a power management status;
    recording the low pin count value and the power management status in the specific data record, and accordingly updating the usage status indicator of the specific data record.

2. The power management method according to claim 1, wherein the usage status indicator of each of the error data records indicates a used state or an unused state, the used state indicates that the corresponding error data record has been used, and the unused state indicates that the corresponding error data record is not used.

3. The power management method according to claim 2, wherein the step of selecting the specific data record from the error data records based on the usage status indicator of each of the error data records comprises:
    selecting at least one candidate data record from the error data records, wherein a usage status indicator of each candidate data record indicates the unused status; and
    selecting one of the candidate data records as the specific data record.

4. The power management method according to claim 3, further comprising:
    in response to failing to find any candidate data records from the error data records, changing the usage status indicator of each of the error data records to indicate the unused state, and selecting at least one candidate data record from the error data records again.

5. The power management method according to claim 1, further comprising:
    in response to determining that the boot alarm is received, recording the boot alarm in the specific data record.

6. The power management method according to claim 1, wherein the step of selecting the specific data record from the error data records based on the usage status indicator of each of the error data records comprises:
    (a1) obtaining an i-th error data record in the error data records and the usage status indicator of the i-th error data record, where an initial value of i is 1; and
    (a2) in response to determining that the usage status indicator of the i-th error data record indicates that the i-th error data record is not used, determining that the i-th error data record is the specific data record.

7. The power management method according to claim 6, further comprising:
    (a3) in response to determining that the usage status indicator of the i-th error data record indicates that the i-th error data record has been used, incrementing i, and repeating step (a1).

8. The power management method according to claim 6, further comprising:
    in response to determining that the usage status indicator of an N-th error data record in the error data records indicates that the N-th error data record has been used, resetting the usage status indicator of each of the error data records, and returning to step (a1), where N is a number of the error data records.

9. The power management method according to claim 1, wherein the step of sequentially sending the enable signal to each of the hardware devices comprises:
    (b1) sending the enable signal to an i-th hardware device of the hardware devices, where an initial value of i is 1; and
    (b2) in response to determining that the enable successful response corresponding to the enable signal is received from the i-th hardware device, incrementing i, and repeating step (b1).

10. The power management method according to claim 9, further comprising:
    in response to determining that the enable successful response corresponding to the enable signal is not received from the i-th hardware device within a specified time, determining that the i-th hardware device is the specific hardware device.

11. A power management device, adapted to control a plurality of hardware devices, wherein the power management device comprises:
    a specific memory, wherein the specific memory comprises a plurality of error data records, and each of the error data records comprises a usage status indicator; and
    a power management circuit, coupled to the specific memory and configured to perform:
    reading the specific memory in the power management device;
    selecting a specific data record from the error data records based on the usage status indicator of each of the error data records;
    sequentially sending an enable signal to each of the hardware devices, wherein the enable signal is used to enable each of the hardware devices;
    in response to determining that an enable successful response corresponding to the enable signal is not received from a specific hardware device of the hardware devices, or a boot alarm is received, at least obtaining a low pin count (LPC) value and a power management status;
    recording the low pin count value and the power management status in the specific data record, and accordingly updating the usage status indicator of the specific data record.

12. The power management device according to claim 11, wherein the usage status indicator of each of the error data records indicates a used state or an unused state, the used state indicates that the corresponding error data record has been used, and the unused state indicates that the corresponding error data record is not used.

13. The power management device according to claim 12, wherein the power management circuit is configured to perform:

selecting at least one candidate data record from the error data records, wherein a usage status indicator of each candidate data record indicates the unused status; and selecting one of the candidate data records as the specific data record.

14. The power management device according to claim 13, wherein the power management circuit is further configured to perform:

in response to failing to find any candidate data records from the error data records, changing the usage status indicator of each of the error data records to indicate the unused state, and selecting at least one candidate data record from the error data records again.

15. The power management device according to claim 11, wherein the power management circuit is further configured to perform:

in response to determining that the boot alarm is received, recording the boot alarm in the specific data record.

16. The power management device according to claim 11, wherein the power management circuit is configured to perform:

(a1) obtaining an i-th error data record in the error data records and the usage status indicator of the i-th error data record, where an initial value of i is 1; and (a2) in response to determining that the usage status indicator of the i-th error data record indicates that the i-th error data record is not used, determining that the i-th error data record is the specific data record.

17. The power management device according to claim 16, wherein the power management circuit is further configured to perform:

(a3) in response to determining that the usage status indicator of the i-th error data record indicates that the i-th error data record has been used, incrementing i, and repeating step (a1).

18. The power management device according to claim 16, wherein the power management circuit is further configured to perform:

in response to determining that the usage status indicator of an N-th error data record in the error data records indicates that the N-th error data record has been used, resetting the usage status indicator of each of the error data records, and returning to step (a1), where N is a number of the error data records.

19. The power management device according to claim 11, wherein the step of sequentially sending the enable signal to each of the hardware devices comprises:

(b1) sending the enable signal to an i-th hardware device of the hardware devices, where an initial value of i is 1; and (b2) in response to determining that the enable successful response corresponding to the enable signal is received from the i-th hardware device, incrementing i, and repeating step (b1).

20. The power management device according to claim 19, further comprising:

in response to determining that the enable successful response corresponding to the enable signal is not received from the i-th hardware device within a specified time, determining that the i-th hardware device is the specific hardware device.

\* \* \* \* \*